(12) United States Patent
Xiang et al.

(10) Patent No.: US 10,509,708 B2
(45) Date of Patent: Dec. 17, 2019

(54) CODE BLOCK RESYNCHRONIZATION FOR DISTRIBUTED MULTI-MIRROR ERASURE CODING SYSTEM

(71) Applicant: VMware, Inc., Palo Alto, CA (US)

(72) Inventors: Enning Xiang, San Jose, CA (US); Yiqi Xu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 127 days.

(21) Appl. No.: 15/621,130

(22) Filed: Jun. 13, 2017

(65) Prior Publication Data
US 2018/0357140 A1  Dec. 13, 2018

(51) Int. Cl.
| | |
|---|---|
| G06F 11/00 | (2006.01) |
| G06F 11/20 | (2006.01) |
| G06F 11/16 | (2006.01) |
| G06F 11/10 | (2006.01) |

(52) U.S. Cl.
CPC ...... *G06F 11/2082* (2013.01); *G06F 11/1088* (2013.01); *G06F 11/1662* (2013.01); *G06F 2201/84* (2013.01)

(58) Field of Classification Search
CPC ............. G06F 11/1662; G06F 11/2056; G06F 11/2058; G06F 11/2064; G06F 11/2082
See application file for complete search history.

(56) References Cited

U.S. PATENT DOCUMENTS

| | | | | |
|---|---|---|---|---|
| 7,415,488 B1* | 8/2008 | Muth | ................... | G06F 11/2082 707/648 |
| 7,526,622 B1* | 4/2009 | Bonwick | ................. | G06F 3/061 711/161 |
| 7,680,839 B1* | 3/2010 | Krishnamurthy | ... | G06F 11/1435 707/610 |
| 8,856,619 B1* | 10/2014 | Cypher | ............... | G06F 11/1044 714/6.2 |
| 8,984,374 B2* | 3/2015 | Yoshihara | ........... | G06F 12/0246 714/52 |
| 9,928,248 B2* | 3/2018 | Akirav | ............... | G06F 17/30156 |
| 9,965,204 B1* | 5/2018 | Cousins | .............. | G06F 11/2069 |
| 10,013,306 B2* | 7/2018 | Umbehocker | ...... | G06F 11/1004 |

(Continued)

OTHER PUBLICATIONS

RAID Levels 1+5 (15) and 5+1 (51), Apr. 17 2001, The PC Guide (Year: 2001).*

(Continued)

*Primary Examiner* — Marc Duncan
(74) *Attorney, Agent, or Firm* — Patterson + Sheridan, LLP (57) ABSTRACT

Techniques are disclosed for resynchronizing a node of a distributed storage system with other nodes of the distributed storage system. Some embodiments presented herein include a computer-implemented method for resynchronizing a node of a distributed storage system with other nodes of the distributed storage system. The method comprises identifying an out-of-sync block of the node. The method further comprises determining that the out-of-sync block is a code block, wherein the code block is generated by performing an erasure coding operation on data blocks which are stored in the other nodes. The method further comprises locating a mirrored code block in an address space maintained for mirrored code blocks. The method further comprises storing contents of the mirrored code block in a storage location of the out-of-sync block.

21 Claims, 5 Drawing Sheets

(56) References Cited

U.S. PATENT DOCUMENTS

| | | | |
|---|---|---|---|
| 10,152,377 B2* | 12/2018 | Sangamkar | G06F 11/1076 |
| 2010/0077013 A1 | 3/2010 | Clements et al. | |
| 2014/0181575 A1* | 6/2014 | Kalach | G06F 11/1415 |
| | | | 714/6.11 |
| 2015/0058384 A1 | 2/2015 | Karamanolis et al. | |
| 2016/0299815 A1* | 10/2016 | Cypher | G06F 17/30194 |
| 2017/0091299 A1* | 3/2017 | Ngan | G06F 11/1471 |
| 2017/0212813 A1* | 7/2017 | Hadas | G06F 11/1469 |
| 2018/0074925 A1* | 3/2018 | Kadayam | G06F 12/0868 |

OTHER PUBLICATIONS

Lowe, Scott, Learn about 'specialty' RAID levels, May 11 2006, ZDnet (Year: 2006).*
Miller, Scott Alan, Choosing a Raid Level by Drive Count, Nov. 6, 2012, SMB IT Journal (Year: 2012).*
Gupta, Anil et al., A proposed Solution: Data Availability and Error Correction in Cloud Computing, 2011, International Journal of Computer Science and Security (IJCSS), vol. 5, pp. 405-413 (Year: 2011).*
Iliadis, Ilias et al., An Efficient Method for Reliability Evaluation of Data Storage Systems, 2015, IARIA, pp. 9-10 (Year: 2015).*
Chen, Yong et al., CoStore: A Reliable and Highly Available Storage System Using Clusters, 2002, IEEE (Year: 2002).*

* cited by examiner

CODE BLOCK RESYNCHRONIZATION FOR DISTRIBUTED MULTI-MIRROR ERASURE CODING SYSTEM

BACKGROUND

Distributed systems allow multiple clients in a network to access a pool of shared resources. For example, a distributed storage system allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines spawned on the host computers may use the datastore, for example, to store virtual disks that are accessed by the virtual machines during their operation. Because the shared local disks that make up the datastore may have different performance characteristics (e.g., capacity, input/output per second (IOPS) capabilities, etc.), usage of such shared local disks to store virtual disks or portions thereof may be distributed among the virtual machines based on the needs of each given virtual machine. Accordingly, in some cases, a virtual disk may be partitioned into different chunks or stripes that are distributed among and stored by local disks of hosts in the datastore.

In addition, as a way to provide fault-tolerance in a distributed storage system, erasure coding technologies are employed to implement redundancies in data storage. In such a system, if one or more of the host computers of the distributed storage system fails or goes offline, the data stored by those host computers can be resynced or reconstructed after they come back online, using the data stored in the other host computers. However, resyncing or reconstructing of the data is sometimes not performance efficient.

DETAILED DESCRIPTION

Figure 1:
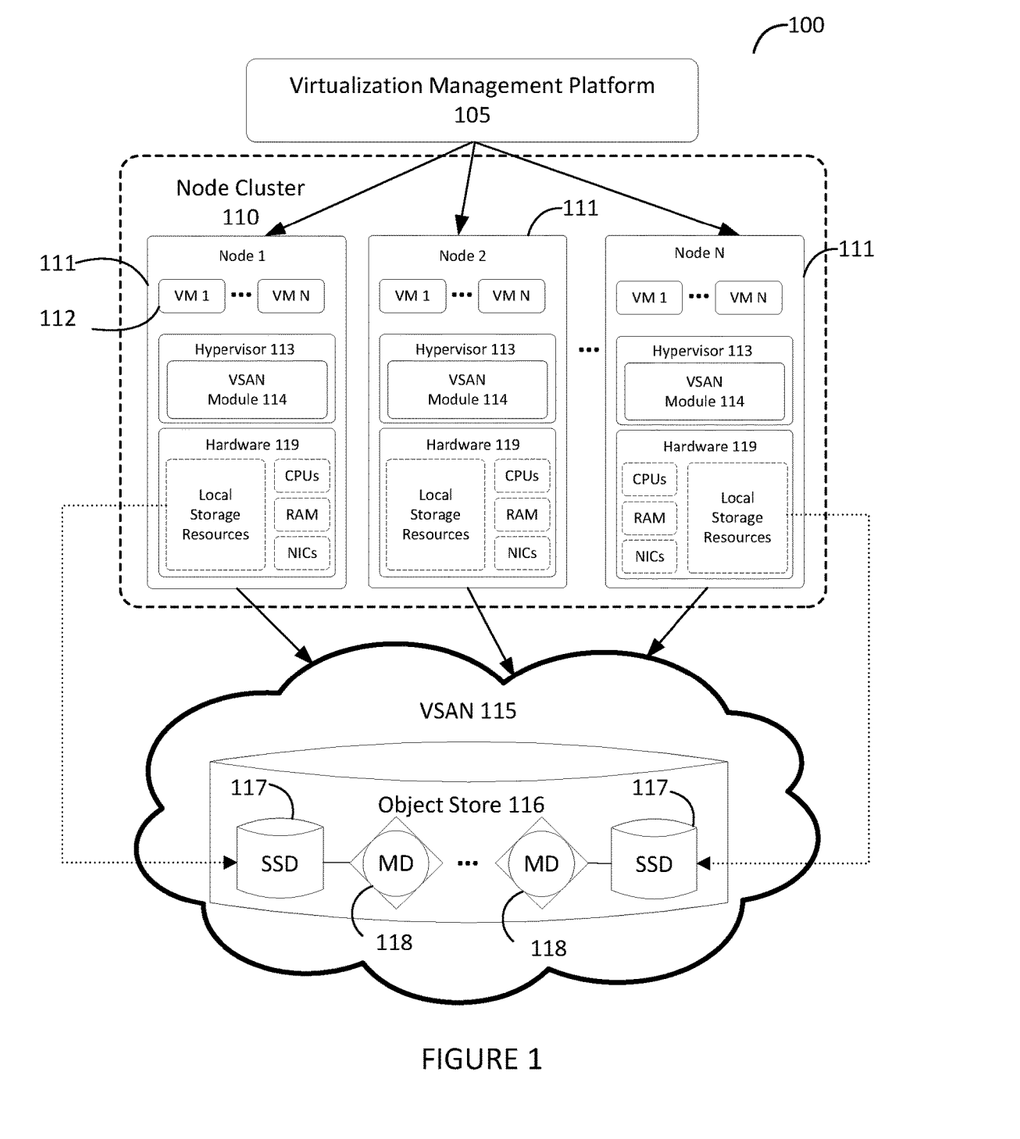
FIG. 1 illustrates an example computing environment in which embodiments may be practiced.

FIG. 1 illustrates a computing environment 100 in which embodiments may be practiced. As shown, computing environment 100 is a software-based "virtual storage area network" (VSAN) environment that leverages the commodity local storage housed in or directly attached (hereinafter, use of the term "housed" or "housed in" may be used to encompass both housed in or otherwise directly attached) to host servers or nodes 111 of a cluster 110 to provide an aggregate object store 116 to virtual machines (VMs) 112 running on the nodes. The local commodity storage housed in or otherwise directly attached to the nodes 111 may include combinations of solid state drives (SSDs) 117 and/or magnetic or spinning disks 118. In certain embodiments, SSDs 117 serve as a read cache and/or write buffer in front of magnetic disks 118 to increase I/O performance. As further discussed below, each node 111 may include a storage management module (referred to herein as a "VSAN module") in order to automate storage management workflows (e.g., create objects in the object store, etc.) and provide access to objects in the object store (e.g., handle I/O operations to objects in the object store, etc.) based on predefined storage policies specified for objects in the object store. For example, because a VM may be initially configured by an administrator to have specific storage requirements for its "virtual disk" depending on its intended use (e.g., capacity, availability, IOPS, etc.), the administrator may define a storage profile or policy for each VM specifying such availability, capacity, IOPS and the like. As further described below, the VSAN module may then create an "object" for the specified virtual disk by backing it with physical storage resources of the object store based on the defined policy.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described below, each hypervisor 113, through its corresponding VSAN module 114, provides access to storage resources located in hardware 119 (e.g., SSDs 117 and magnetic disks 118) for use as storage for virtual disks (or portions thereof) and other related files that may be accessed by any VM 112 residing in any of nodes 111 in cluster 110.

In one embodiment, VSAN module 114 is implemented as a "VSAN" device driver within hypervisor 113. In such an embodiment, VSAN module 114 provides access to a conceptual "VSAN" 115 through which an administrator can create a number of top-level "device" or namespace objects that are backed by object store 116. For example, during creation of a device object, the administrator specifies a particular file system for the device object (such device objects hereinafter also thus referred to "file system objects") such that, during a boot process, each hypervisor 113 in each node 111 discovers a /vsan/ root node for a conceptual global namespace that is exposed by VSAN module 114. By accessing APIs exposed by VSAN module 114, hypervisor 113 can then determine all the top-level file system objects (or other types of top-level device objects) currently residing in VSAN 115. When a VM (or other client) attempts to access one of the file system objects, hypervisor 113 may then dynamically "auto-mount" the file system object at that time. In certain embodiments, file system objects may further be periodically "auto-unmounted" when access to objects in the file system objects cease or are idle for a period of time. A file system object (e.g., /vsan/fs_name1, etc.) that is accessible through VSAN 115 may, for example, be implemented to emulate the semantics of a particular file system such as VMware Inc.'s distributed or clustered file system, VMFS, which is designed to provide concurrency control among simultaneously accessing VMs. Because VSAN 115 supports multiple file system objects, it is able provide storage resources through object store 116 without being confined by limitations of any particular clustered file system. For example, many clustered file systems can only scale to support a certain amount of nodes 111. By providing multiple top-level file system object support, VSAN 115 overcomes the scalability limitations of such clustered file systems.

As described in further detail in the context of FIG. 2 below, a file system object, may, itself, provide access to a number of virtual disk descriptor files accessible by VMs 112 running in cluster 110. These virtual disk descriptor files contain references to virtual disk "objects" that contain the actual data for the virtual disk and are separately backed by object store 116. A virtual disk object may itself be a hierarchical or "composite" object that is further composed of "component" objects (again separately backed by object store 116) that reflect the storage requirements (e.g., capacity, availability, IOPs, etc.) of a corresponding storage profile or policy generated by the administrator when initially creating the virtual disk. Each VSAN module 114 (through a cluster level object management or "CLOM" sub-module, in embodiments as further described below) communicates with other VSAN modules 114 of other nodes 111 to create and maintain an in-memory metadata database (e.g., maintained separately but in synchronized fashion in the memory of each node 111) that contains metadata describing the locations, configurations, policies and relationships among the various objects stored in object store 116. This in-memory metadata database is utilized by a VSAN module 114 on a node 111, for example, when an administrator first creates a virtual disk for a VM as well as when the VM is running and performing I/O operations (e.g., read or write) on the virtual disk. As further discussed below in the context of FIG. 3, VSAN module 114 (through a document object manager or "DOM" sub-module, in one embodiment as further described below) traverses a hierarchy of objects using the metadata in the in-memory database in order to properly route an I/O operation request to the node (or nodes) that houses (house) the actual physical local storage that backs the portion of the virtual disk that is subject to the I/O operation.

Figure 2:
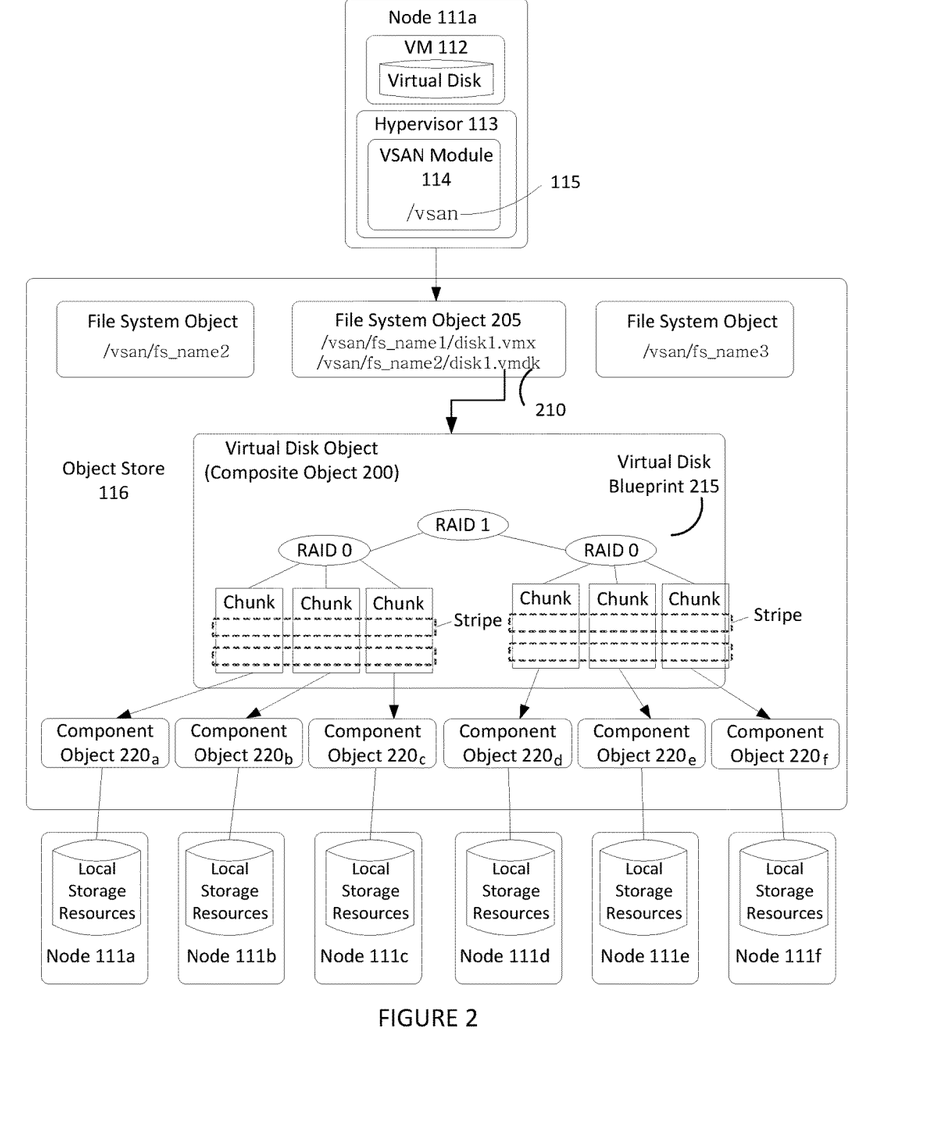
FIG. 2 illustrates an example hierarchical structure of objects organized within an object store that represent a virtual disk.

FIG. 2 illustrates an example hierarchical structure of objects organized within object store 116 that represent a virtual disk. As previously discussed above, a VM 112 running on one of nodes 111 may perform I/O operations on a virtual disk that is stored as a hierarchical or composite object 200 in object store 116. Hypervisor 113 provides VM 112 access to the virtual disk by interfacing with the abstraction of VSAN 115 through VSAN module 114 (e.g., by auto-mounting the top-level file system object corresponding to the virtual disk object). For example, VSAN module 114, by querying its local copy of the in-memory metadata database, is able to identify a particular file system object 205 (e.g., a VMFS file system object in one embodiment, etc.) stored in VSAN 115 that stores a descriptor file 210 for the virtual disk. It should be recognized that the file system object 205 may store a variety of other files consistent with its purpose, such as virtual machine configuration files and the like when supporting a virtualization environment. In certain embodiments, each file system object may be configured to support only those virtual disks corresponding to a particular VM (e.g., a "per-VM" file system object).

Descriptor file 210 includes a reference to composite object 200 that is separately stored in object store 116 and conceptually represents the virtual disk (and thus may also be sometimes referenced herein as a virtual disk object).

Composite object 200 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by an administrator when creating the virtual disk.

Depending on the desired level of fault tolerance or performance efficiency, a virtual disk blueprint 215 may direct that composite object 200 be stored in datastore in a variety of ways. FIG. 2 shows composite object 200 that includes a virtual disk blueprint 215 describing a RAID 1 configuration where two mirrored copies of the virtual disk (e.g., mirrors) are each further striped in a RAID 0 configuration. Data striping refers to segmenting logically sequential data, such as a virtual disk. Each stripe contains a plurality of data blocks and one or more code blocks. In addition, one or more data and code blocks of the virtual disk are further grouped into chunks. Composite object 200 may thus contain references to a number of "leaf" or "component" objects 220, corresponding to each chunk. The metadata accessible by VSAN module 114 in the in-memory metadata database for each component object 220 (i.e., for each chunk) provides a mapping to or otherwise identifies a particular node $111_x$ in cluster 110 that houses the physical storage resources (e.g., magnetic disks 118, etc.) that actually store the chunk (as well as the location of the chunk within such physical resource).

Figure 3:
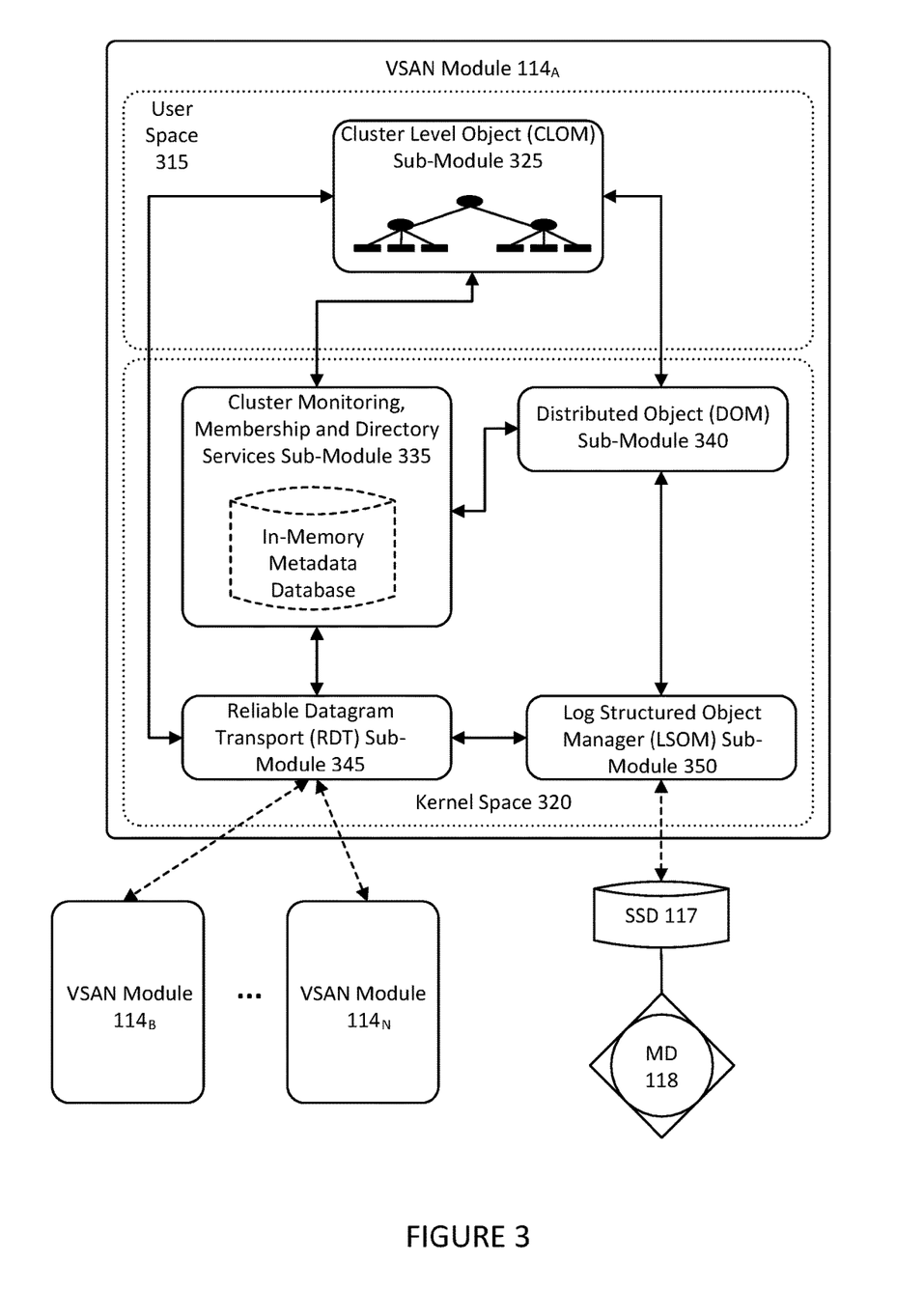
FIG. 3 illustrates components of a VSAN module.

FIG. 3 illustrates components of a VSAN module 114. As previously described, in certain embodiments, VSAN module 114 may execute as a device driver exposing an abstraction of a VSAN 115 to hypervisor 113. Various sub-modules of VSAN module 114 handle different responsibilities and may operate within either user space 315 or kernel space 320 depending on such responsibilities. As depicted in the embodiment of FIG. 3, VSAN module 114 includes a cluster level object management (CLOM) sub-module 325 that operates in user space 315. CLOM sub-module 325 generates virtual disk blueprints during creation of a virtual disk by an administrator and ensures that objects created for such virtual disk blueprints are configured to meet storage profile or policy requirements set by the administrator. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by an administrator to the storage profile or policy relating to an object or when changes to the cluster or workload result in an object being out of compliance with a current storage profile or policy.

In one embodiment, if an administrator creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/chunks of the virtual disk to achieve load balancing, etc.). For example, CLOM sub-module 325, in one embodiment, is responsible for generating blueprint 215 describing the RAID 1/RAID 0 configuration for virtual disk object 200 in FIG. 2 when the virtual disk was first created by the administrator. As previously discussed, a storage policy may specify requirements for capacity, IOPS, availability, and reliability. Storage policies may also specify a workload characterization (e.g., random or sequential access, I/O request size, cache size, expected cache hit ration, etc.). Additionally, the administrator may also specify an affinity to VSAN module 114 to preferentially use certain nodes 111 (or the local disks housed therein). For example, when provisioning a new virtual disk for a VM, an administrator may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, CLOM sub-module 325 consults the in-memory metadata database maintained by its VSAN module 114 to determine the current state of cluster 110 in order generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340 which interacts with object space 116 to implement the blueprint by, for example, allocating or otherwise mapping component objects (e.g., chunks) of the composite object to physical storage locations within various nodes 111 of cluster 110.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in-memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database serves as a directory service that maintains a physical inventory of the VSAN environment, such as the various nodes 111, the storage resources in the nodes 111 (SSD, magnetic disks, etc.) housed therein and the characteristics/capabilities thereof, the current state of the nodes 111 and there corresponding storage resources, network paths among the nodes 111, and the like. As previously discussed, in addition to maintaining a physical inventory, the in-memory metadata database further provides a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations. For example, as previously discussed, during virtual disk creation, CLOM sub-module 325 accesses the in-memory metadata database to generate a virtual disk blueprint, and in order to handle an I/O operation from a running VM 112, DOM sub-module 340 accesses the in-memory metadata database to determine the nodes 111 that store the component objects (e.g., chunks) of a corresponding composite object (e.g., virtual disk object) and the paths by which those nodes are reachable in order to satisfy the I/O operation.

As previously discussed, DOM sub-module 340, during the handling of I/O operations as well as during object creation, controls access to and handles operations on those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network with a different DOM sub-module 340 in a second node 111 (or nodes) that serves as the coordinator for the particular component object (e.g., chunk, etc.) of the virtual disk object that is stored in the local storage of the second node 111 and which is the portion of the virtual disk that is subject to the I/O operation. If the VM issuing the I/O operation resides on a node 111 that is also different from the coordinator of the virtual disk object, the DOM sub-module 340 of the node running the VM would also have to communicate across the network with the DOM sub-module 340 of the coordinator. In certain embodiments, if the VM issuing the I/O operation resides on node that is different from the coordinator of the virtual disk object subject to the I/O operation, the two DOM sub-modules 340 of the two nodes may to communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 also similarly communicate amongst one another during object creation. For example, a virtual disk blueprint generated by CLOM module 325 during creation of a virtual disk may include information that designates which nodes 111 should serve as the coordinators for the virtual disk object as well as its corresponding component objects (chunks, etc.). Each of the DOM sub-modules 340 for such designated nodes is issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 interacts with a log structured object manager (LSOM) sub-module 350 that serves as the component in VSAN module 114 that actually drives communication with the local SSDs and magnetic disks of its node 111. In addition to allocating local storage for component objects (as well as to store other metadata such a policies and configurations for composite objects for which its node serves as coordinator, etc.), LSOM sub-module 350 additionally monitors the flow of I/O operations to the local storage of its node 111, for example, to report whether a storage resource is congested.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In one embodiment, the underlying transport is TCP. Alternatively, other transports such as RDMA may be used. RDT sub-module 345 is used, for example, when DOM sub-modules 340 communicate with one another, as previously discussed above to create objects or to handle I/O operations. In certain embodiments, RDT module 345 interacts with CMMDS module 335 to resolve the address of logical endpoints dynamically in order to maintain up-to-date location information in the in-memory metadata database as well as to create, remove, or reestablish connections based on link health status. For example, if CMMDS module 335 reports a link as unhealthy, RDT sub-module 345 may drop the connection in favor of a link in better condition.

As described above, in some cases, one or more nodes 111 within node cluster 110 may fail or go offline, resulting in a loss of the data and/or code blocks stored by such nodes. In such cases, the distributed storage system or VSAN environment 100 has to be able to tolerate such a failure and efficiently reconstruct the missing data blocks. In some other cases, a node 111 may go offline temporarily and then come back online resulting in some out-of-sync data blocks. Similarly, in such cases, the distributed storage system has to be configured with fault tolerance technologies to resync such out-of-sync data and/or code blocks. Accordingly, to increase performance efficiency and fault tolerance, distributed storage systems (e.g., VSAN environment 100) may implement a variety of fault tolerance technologies, such as the various levels of RAID and/or erasure coding, etc. As described above in relation to FIG. 2, depending on the required level of performance and fault tolerance, virtual disk blueprint 215 may direct that composite object 200 be distributed in one of several ways. In some embodiments, one or a combination of RAID levels (e.g. RAID 0 to RAID 6) is used, where each RAID level or a combination thereof provides a different level of fault tolerance and performance enhancement. Referring back to FIG. 2, for example, FIG. 2 illustrates an example of the application of RAID 1, which entails creating a replica of composite object 200. This is to ensure that a second copy (e.g., branch object 200b) of composite object 200 is still available if a first copy (e.g., branch object 200a) is lost due to some sort of failure (e.g. disk failure etc.).

In addition to RAID 1, FIG. 2 also illustrates the application of RAID 0 to the two copies of composite object 200 (branch object 200a and branch object 200b, created as a result of RAID 1). Under RAID 0, each copy of composite object 200 is partitioned into smaller data stripes and distributed across local storage resources of various nodes in the datastore. In some cases, striping a copy of composite object 200 over local storage resources of various nodes enhances performance as compared to storing the entire copy of composite object 200 in a single node. This is because striping the data means that smaller amounts of data are written to or read from local storage resources of multiple nodes in parallel, thereby reducing the amount of time to complete a particular read or write operation. However, multiplying the number of nodes used to store the various chunks of data increases the probability of failure, and thus data loss.

Accordingly, to achieve a higher level of fault tolerance, in some embodiments, erasure coding is applied. Erasure coding (EC) is a method of data protection in which each copy of composite object 200 is partitioned into stripes, expanded and encoded with redundant data pieces, and stored across different nodes of the datastore. For example, a copy of composite object 200 is organized or partitioned into stripes, each of which is broken up into N equal-sized data blocks. Without applying EC, the N data blocks are distributed across different nodes of the datastore, such that the original stripe is reconstructable by putting the N data blocks together. However, in some cases, one or more nodes, each hosting one of the N data blocks of composite object 200, may fail or go offline. In such cases, data loss may result and there may be no way of recovering such data block absent any fault tolerance mechanisms.

In some embodiments, to address such situations and provide fault tolerance, erasure codes are used to encode an additional M equal-sized code block(s) (interchangeably referred to as "parity blocks") from the original N data blocks, where N is a larger number than M. The M equal-sized code block(s) then provide fault tolerance and enable reconstruction of one or more lost data blocks in the same stripe should one or more of the underlying nodes fail. More specifically, each code block includes parity values computed from the N data blocks in the same stripe using an erasure coding algorithm. An application of an exclusive OR (i.e., XOR) operation to the N data blocks of the stripe, for computing a code block, is one example of applying an erasure coding algorithm, in which case the computed code block contains the XOR of data corresponding to the N data blocks in the stripe. In such an example, if one of the N data blocks is lost due to a failure of its underlying node, it is then able to be reconstructed by performing an XOR operation of the remaining data blocks as well as the computed code block in the same stripe. Depending on the level of fault tolerance desired, different erasure codes are applied in creating the one or more M code blocks. RAID 5 and RAID 6 are common examples of applying erasure coding. In RAID 5, an exclusive OR (i.e. XOR) operation is performed on multiple data blocks to compute a single parity block. An example of the application of RAID 5 in a distributed storage system is illustrated in FIG. 4.

Figure 4:
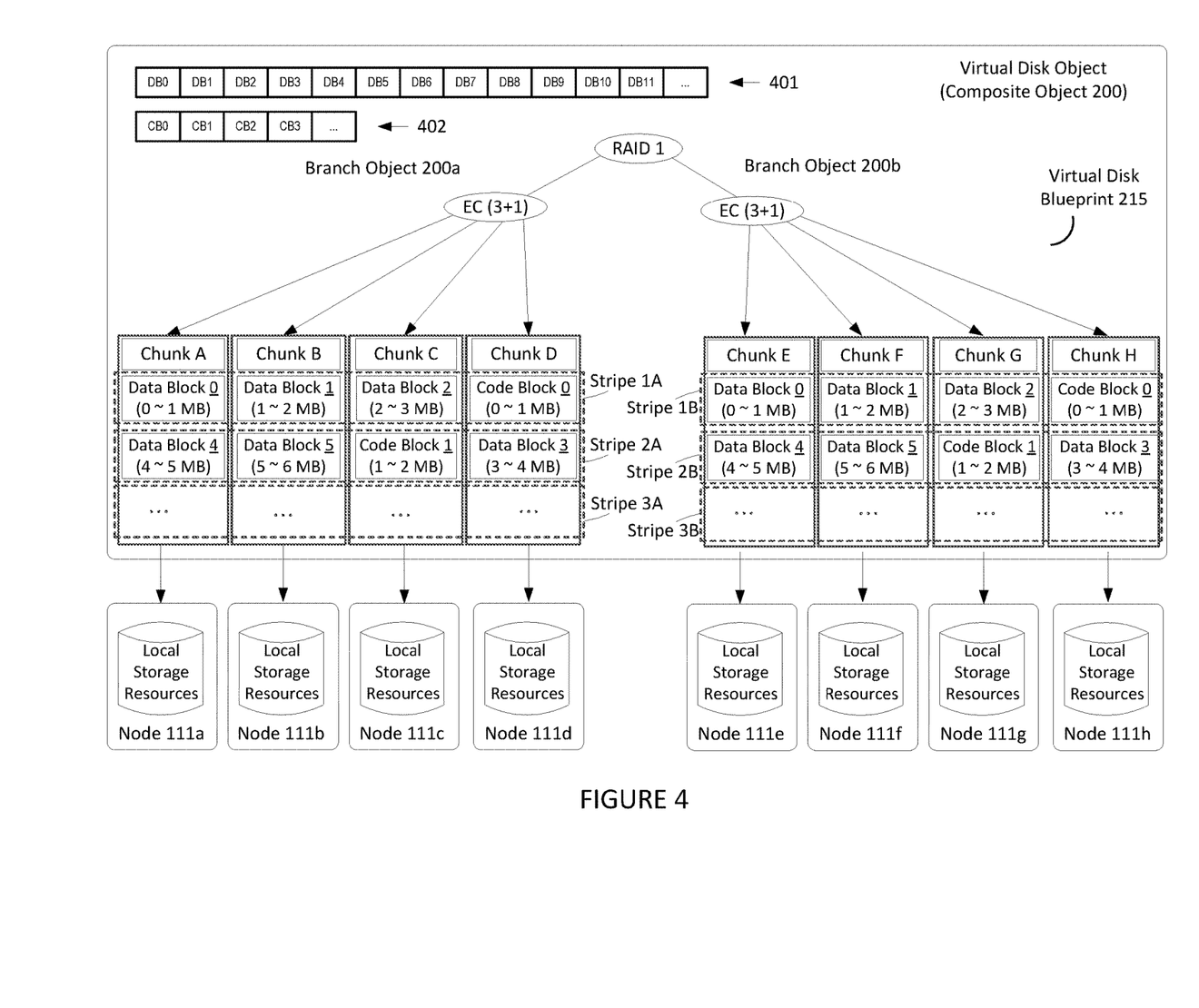
FIG. 4 illustrates an example of applying erasure coding to a virtual disk object.

FIG. 4 shows each copy of composite object 200 being erasure coded with a 3+1 ratio, such that each copy is partitioned into multiple stripes (e.g. stripes 1A-NA, stripes 1B-NB), where each stripe is further broken up into 3 data blocks (N) and 1 code block (M) (e.g. 3+1 ratio). It is important to note that the (3+1) EC ratio is merely an example and is not intended to limit the scope of the present disclosure. For example, under RAID 5, a larger number of data blocks, such as 5 or 6 or 10 data blocks, may be used to generate a single code block, resulting in EC ratios of (5+1), (6+1), or (10+1), etc., respectively.

In the example of FIG. 4, using the (3+1) EC ratio, each data or code block includes 1 MB of data such that each data stripe comprises 4 MB of data. In other embodiments, the data or code blocks may have other sizes, ranging from 0.1 MB to 10 GB, or higher. As further illustrated in FIG. 4, the data and code blocks in each stripe are distributed across different nodes (e.g. node 111a through node 111h). For example, chunk A comprises all data or code blocks of branch object 200a that are stored in node 111a, while chunk B includes all data or code blocks of branch object 200a that are stored in node 111b. In some embodiments, each chunk is 1 GB in size.

As shown in FIG. 4, the data and code blocks of each stripe of each copy of the composite object are distributed across different chunks based on a defined distribution logic (i.e., virtual disk blueprint 215), which in this case is the logic of RAID 5. This defined distribution logic for distributing data and code blocks of a branch object is applied at the time when the branch object is being written stripe by stripe. For branch object 200a, whose metadata defines a logical address space 401 for its data blocks and a logical address space 402 for its code blocks, when the first three data blocks (data blocks 0, 1, and 2) of stripe 1A are ready to be written, a code block is first generated by applying an EC (e.g., XOR operation) to the three data blocks resulting in code block (code block 0). Subsequently, the defined distribution logic described above is applied to direct the order of distribution for the three data blocks (data blocks 0, 1, and 2) and one code block (code block 0) across the chunks.

Under the defined distribution logic of RAID 5, code blocks of each stripe of data are distributed across different chunks, such that, for instance, code block 0 of stripe 1A is stored in chunk D of node 111*d* while code block 1 of stripe 2A is stored in chunk C of node 111*c*. This is because, if all the code blocks were stored in one node, such as node 111*d*, all the code blocks may be lost in the event that node 111*d* fails and, therefore, the corresponding data blocks may no longer be reconstructable in case of multiple node failures. Accordingly, continuing with the example of branch object 200*a* above, the first three data blocks and the code block are distributed sequentially such that data block 0 is stored in chunk A, data block 1 is stored in chunk B, data block 2 is stored in chunk C, and code block 0 is stored in chunk D. Moving to the next stripe, stripe 2A, the next three data blocks 3-5 and code block 1, generated using data blocks 3-5, are distributed across the nodes in a similar manner, except they are stored in chunks D, A, B, and C, respectively. For the next stripe, data blocks 6-8 and code block 2 generated using data blocks 6-8 are stored in chunks C, D, A, and B, respectively. Similarly, data blocks 9-11 and code block 3 generating using data blocks 9-11 are stored in chunks B, C, D, and A, respectively. Subsequent blocks of stripes are distributed across the nodes according to the defined distribution logic described above.

In the event that a data block is lost or needs to be resynced due to a node failing or going offline, the data blocks may be reconstructed or resynced by performing an XOR of the related blocks in a corresponding stripe on the remaining operational disk drives or nodes. Accordingly, any N number of blocks, including a code block, are sufficient to reconstruct or resync a data block. For example, if node 111*b* goes offline and disconnects from the system, after node 111*b* comes back online and reconnects to the distributed storage system, some or all blocks in chunk B of branch object 200*a* (e.g. data block 1 of stripe 1A and data block 5 of stripe 2A, etc.) may need to be resynchronized. This is because during the time period when node 111*b* is offline, any write request to one or more blocks of chunk B will fail, resulting in the one or more blocks of chunk B being out-of-sync.

In one embodiment, whether a data block within a chunk needs resyncing or not is indicated by a resyncing bitmap for that chunk, which is created from tracking bitmaps that are instantiated when that chunk went offline. For example, assuming that node 111*a* is selected as a coordinating node for branch object 200*a*, when a node (e.g., node 111*b*) storing a chunk of the branch object 200*a* goes offline, DOM sub-module 340 of VSAN module 114 of a coordinating node (e.g., node 111*a*) records a LSN (latest write sequence number) at the time the chunk that went offline and persists this information to all the online nodes. In addition, DOM sub-module 340 of each of the online nodes creates a tracking bitmap corresponding to the recorded LSN, and updates that tracking bitmap each time it performs a write operation to a chunk of that node.

At the time the offline node comes back online, DOM sub-module 340 of the coordinating node creates a resyncing bitmap for the entire logical address space of the out-of-sync chunk. In some embodiments, each bit in the resyncing bitmap corresponds to a block in the logical address space of the out-of-sync chunk. In one embodiment, DOM sub-module 340 of the coordinating node creates the resyncing bitmap based on the recorded. LSN and the tracking bitmaps corresponding to the recorded LSN as follows.

First, DOM sub-module 340 of the coordinating node initializes all bits of the resyncing bitmap to zero. Then, DOM sub-module 340 of the coordinating node locates a block in one of the chunks associated with the recorded LSN+1. After determining this offset, DOM sub-module 340 of the coordinating node traverses the blocks of all the chunks, beginning with the block in one of the chunks associated with the recorded LSN+1 until all of the bits in the tracking bitmaps have been accounted for. The order of traversal is determined according to the defined distribution logic (e.g., A-B-C-D, D-A-B-C, C-D-A-B, R-C-D-A). During the traversal, DOM sub-module 340 of the coordinating node sets the bit in the resyncing bitmap corresponding to each block of the out-of-sync chunk that is traversed to one.

FIG. 4 shows branch object 200 being mirrored or duplicated into two copies by applying RAID 1. In some embodiments, other mirroring methodologies are used, such that branch object 200 is mirrored into more than two copies (e.g. 3, 4, 5, etc. copies). The mirroring allows an additional level of fault tolerance such that in the event that a node fails, in addition to being able to resync an out-of-sync data block using the remaining data and code blocks, data may be fetched from a mirrored copy of branch object 200. According to one or embodiments, resyncing of data or code blocks is carried out by fetching a copy of the corresponding data/code block from a mirrored copy.

Figure 5:
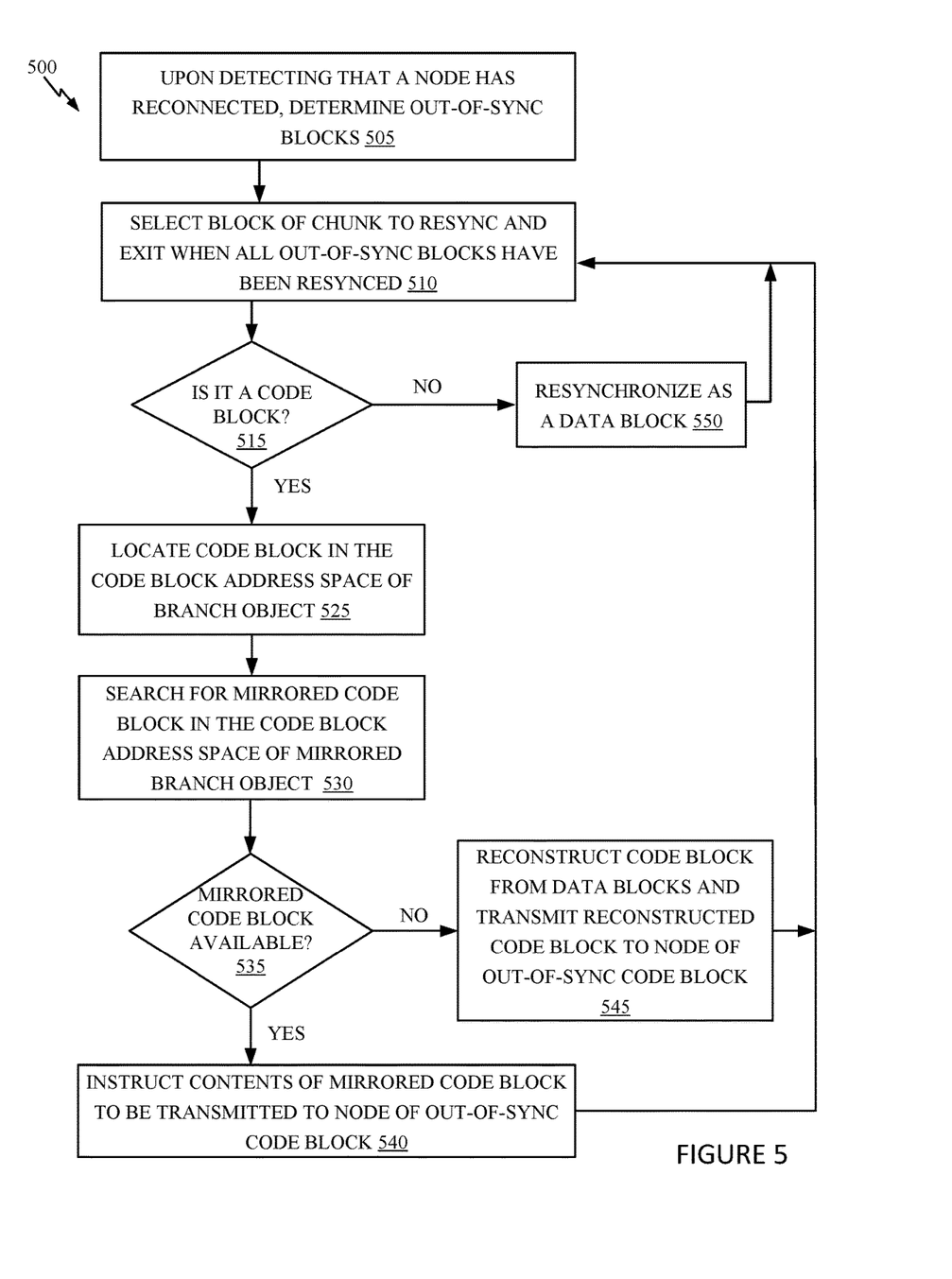
FIG. 5 illustrates operations for resyncing a block of an erasure coded virtual disk object, according to one or more embodiments.

FIG. 5 illustrates operations for resyncing a block of an erasure coded virtual disk object (e.g., branch object 200*a*), according to one or more embodiments. As described above, a node in a distributed storage system may go offline temporarily and come back online. This may result in one or more data and/or code blocks in a chunk of a branch object stored in the node going out-of-sync.

The operations begin at 505 responsive to DOM sub-module 340 of a coordinating node (e.g., node 111*a*) detecting that a node (e.g., node 111*b*) that had been offline reconnected. Upon detecting the reconnection, DOM sub-module 340 creates the resyncing bitmap corresponding to the logical address space of the chunk of the reconnected node, as described above.

At 510, DOM sub-module 340 selects an out-of-sync block of the reconnected node to resync. To select an out-of-sync block, DOM sub-module 340 examines the resyncing bitmap created at 505 for bits set to one. For each bit set to one, DOM sub-module 340 locates a block corresponding to that bit in the logical address space of the chunk, and selects that block as an out-of-sync block. At 515, DOM sub-module 340 determines whether the out-of-sync block is a data block or a code block, by examining logical address space 401 of data blocks and logical address space 402 of code blocks. If the out-of-sync block maps to logical address space 401, then the out-of-sync block is determined to be a data block. On the other hand, if the out-of-sync block maps to logical address space 402, then the out-of-sync block is determined to be a code block.

If the selected block is a code block, DOM sub-module 340 locates the code block in logical address space 402, and locates the corresponding block (hereinafter referred to as "mirrored code block") at 530 in the logical address space of code blocks of the mirrored branch object (e.g., branch object 200*b*), which includes a pointer to a physical location of the code block in one of nodes 111*e* to 111*h*. Then, at 535, DOM sub-module 340 determines if the mirrored code block is available. If the mirrored code block is available, DOM sub-module 340 at 540 instructs the node storing contents of the mirrored code block to transmit the contents to the reconnected node for storage in a location corresponding to the code block in the reconnected node. If, however, the mirrored data block is not available, such as when the node storing the contents of such mirrored code block has also failed, DOM sub-module 340 at 545 reconstructs the code block by performing an XOR operation on three data blocks of the same stripe as the code block, and transmitting the results of the XOR operation to the reconnected node for storage in a location corresponding to the code block in the reconnected node. After the code block is resynced, in some embodiments, DOM sub-module 340 updates the bit corresponding to the code block in the resyncing bitmap by, for example, setting it back to zero, to indicate that the corresponding block is no longer out-of-sync.

If the selected block is a data block, DOM sub-module 340 at 550 resyncs it by locating the block in logical address space 401, locating the corresponding block (hereinafter referred to as "mirrored data block") in the logical address space of data blocks of the mirrored branch object (e.g., branch object 200b), which includes a pointer to a physical location of the data block in one of nodes 111e to 111h, and instructing the node storing the contents of the mirrored data block to transmit the contents to the reconnected node for storage in a location corresponding to the data block in the reconnected node. In situations where the mirrored data block is not available, such as when the node storing contents of the mirrored data block has also failed, DOM sub-module 340 reconstructs the data block by performing an XOR operation on the other two data blocks and code block of the same stripe, and transmitting the results of the XOR operation to the reconnected node for storage in a location corresponding to the data block in the reconnected node. After the data block is resynced, in some embodiments, DOM sub-module 340 updates the bit corresponding to the data block in the resyncing bitmap by, for example, setting it back to zero to indicate that the corresponding block is no longer out-of-sync.

After 540, 545, and 550, the flow of operations returns to 510 so long as there is another block to be resynced. Otherwise, the flow terminates.

Embodiments described above may be extended to distributed storage systems having more than two copies of composite object 200. In addition, embodiments described above similarly apply in cases where an application of an erasure coding algorithm results in more than one code block, such as ones employing a 6+2 coding scheme or a 9+3 coding scheme.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims

We claim:

1. A method of resynchronizing a node of a distributed storage system with other nodes of the distributed storage system, comprising:
   identifying an out-of-sync block of the node;
   determining that the out-of-sync block is a code block, wherein the code block is generated by performing an erasure coding operation on data blocks which are stored in the other nodes, wherein:
  determining that the out-of-sync block is a code block is based on determining that the out-of-sync block maps to an address space maintained for code blocks including the out-of-sync block, and
  the address space maintained for code blocks is different from an address space maintained for a plurality of data blocks including the data blocks;
locating a mirrored code block in an address space maintained for mirrored code blocks; and
storing contents associated with the mirrored code block in a storage location of the out-of-sync block.

2. The method of claim 1, further comprising:
determining that the contents of the mirrored code block can be read from a storage location of the mirrored code block;
based on the determining:
  reading the contents of the mirrored code block from the storage location of the mirrored code block, wherein the contents associated with the mirrored code block comprise the read contents.

3. The method of claim 1, further comprising:
determining that the contents of the mirrored code block cannot be read from a storage location of the mirrored code block;
based on the determining:
  reconstructing the contents of the mirrored code block from the data blocks which are stored in the other nodes, wherein the contents associated with the mirrored code block comprise the reconstructed contents.

4. The method of claim 1, wherein
a storage location of the mirrored code block is identified in the address space maintained for mirrored code blocks based on the storage location of the out-of-sync block in the address space maintained for code blocks including the out-of-sync block.

5. The method of claim 4, further comprising:
maintaining first metadata for the code blocks including the out-of-sync block, the first metadata defining the address space maintained for code blocks including the out-of-sync block; and
maintaining second metadata for the plurality of data blocks including the data blocks which are stored in the other nodes, the second metadata defining the address space maintained for the plurality of data blocks including the data blocks which are stored in the other nodes.

6. The method of claim 1, wherein identifying the out-of-sync block of the node comprises:
generating a resynching bitmap of blocks of the node, the resynching bitmap indicating which blocks of the node are out-of-sync based on write operations that were carried out in the other nodes while the node was offline.

7. The method of claim 6, wherein generating the resynching bitmap comprises generating the resynching bitmap using a plurality of tracking bitmaps instantiated to keep track of the write operations carried out in the other nodes while the node was offline.

8. A non-transitory computer readable storage medium comprising instructions that are executable in a computer system to cause the computer system to perform a method of resynchronizing a node of a distributed storage system with other nodes of the distributed storage system, the method comprising:
identifying an out-of-sync block of the node;
determining that the out-of-sync block is a code block, wherein the code block is generated by performing an erasure coding operation on data blocks which are stored in the other nodes, wherein:
  determining that the out-of-sync block is a code block is based on determining that the out-of-sync block maps to an address space maintained for code blocks including the out-of-sync block, and
  the address space maintained for code blocks is different from an address space maintained for a plurality of data blocks including the data blocks;
locating a mirrored code block in an address space maintained for mirrored code blocks; and
storing contents associated with the mirrored code block in a storage location of the out-of-sync block.

9. The non-transitory computer readable storage medium of claim 8, wherein the method further comprises:
determining that the contents of the mirrored code block can be read from a storage location of the mirrored code block;
based on the determining:
  reading the contents of the mirrored code block from the storage location of the mirrored code block, wherein the contents associated with the mirrored code block comprise the read contents.

10. The non-transitory computer readable storage medium of claim 8, wherein the method further comprises:
determining that the contents of the mirrored code block cannot be read from a storage location of the mirrored code block;
based on the determining:
  reconstructing the contents of the mirrored code block from the data blocks which are stored in the other nodes, wherein the contents associated with the mirrored code block comprise the reconstructed contents.

11. The non-transitory computer readable storage medium of claim 8, wherein
a storage location of the mirrored code block is identified in the address space maintained for mirrored code blocks based on the storage location of the out-of-sync block in the address space maintained for code blocks including the out-of-sync block.

12. The non-transitory computer readable storage medium of claim 11, wherein the method further comprises:
maintaining first metadata for the code blocks including the out-of-sync block, the first metadata defining the address space maintained for code blocks including the out-of-sync block; and
maintaining second metadata for the plurality of data blocks including the data blocks which are stored in the other nodes, the second metadata defining the address space maintained for the plurality of data blocks including the data blocks which are stored in the other nodes.

13. The non-transitory computer readable storage medium of claim 8, wherein identifying the out-of-sync block of the node comprises:
generating a resynching bitmap of blocks of the node, the resynching bitmap indicating which blocks of the node are out-of-sync based on write operations that were carried out in the other nodes while the node was offline.

14. The non-transitory computer readable storage medium of claim 13, wherein generating the resynching bitmap comprises generating the resynching bitmap using a plurality of tracking bitmaps instantiated to keep track of the write operations carried out in the other nodes while the node was offline.

15. A computer system for resynchronizing a node of a distributed storage system with other nodes of the distributed storage system, comprising:
   a memory; and
   a processor configured to:
      identify an out-of-sync block of the node;
      determine that the out-of-sync block is a code block, wherein the code block is generated by performing an erasure coding operation on data blocks which are stored in the other nodes, wherein:
         the processor being configured to determine that the out-of-sync block is a code block is based on determining that the out-of-sync block is a code block is based on determining that the out-of-sync block maps to an address space maintained for code blocks including the out-of-sync block, and
         the address space maintained for code blocks is different from an address space maintained for a plurality of data blocks including the data blocks;
      locate a mirrored code block in an address space maintained for mirrored code blocks; and
      store contents associated with the mirrored code block in a storage location of the out-of-sync block.

16. The computer system of claim 15, wherein the processor is further configured to:
   determine that the contents of the mirrored code block can be read from the storage location of the mirrored code block;
   based on the determining:
      read the contents of the mirrored code block from the storage location of the mirrored code block, wherein the contents associated with the mirrored code block comprise the read contents.

17. The computer system of claim 15, wherein the processor is further configured to:
   determine that the contents of the mirrored code block cannot be read from a storage location of the mirrored code block;
   based on the determining:
      reconstruct the contents of the mirrored code block from the data blocks which are stored in the other nodes, wherein the contents associated with the mirrored code block comprise the reconstructed contents.

18. The computer system of claim 15, wherein:
   a storage location of the mirrored code block is identified in the address space maintained for mirrored code blocks based on the storage location of the out-of-sync block in the address space maintained for code blocks including the out-of-sync block.

19. The computer system of claim 18, wherein the processor is further configured to:
   maintain first metadata for the code blocks including the out-of-sync block, the first metadata defining the address space maintained for code blocks including the out-of-sync block; and
   maintain second metadata for the plurality of data blocks including the data blocks which are stored in the other nodes, the second metadata defining the address space maintained for the plurality of data blocks including the data blocks which are stored in the other nodes.

20. The computer system of claim 15, wherein the processor being configured to identify the out-of-sync block of the node comprises the processor being configured to:
   generate resynching bitmap of blocks of the node, the resynching bitmap indicating which blocks of the node are out-of-sync based on write operations that were carried out in the other nodes while the node was offline.

21. The computer system of claim 20, wherein the processor being configured to generate the resynching bitmap comprises the processor being configured to generate the resynching bitmap using a plurality of tracking bitmaps instantiated to keep track of the write operations carried out in the other nodes while the node was offline.

* * * * *